United States Patent
Galbreath

Patent Number: 5,979,983
Date of Patent: Nov. 9, 1999

[54] CAR SEAT WITH HOLDER FOR SHIELD AND STRAPS

[76] Inventor: John Alexander Galbreath, 6 Smoke Rise La., Bedminster, N.J. 07921

[21] Appl. No.: 09/143,923

[22] Filed: Aug. 29, 1998

[51] Int. Cl.⁶ .................................................... B60N 2/28
[52] U.S. Cl. .................. 297/256.15; 297/467; 297/481; 297/DIG. 6
[58] Field of Search ............................ 297/250.1, 256.15, 297/467, 481, 484, DIG. 6, 487, 488

[56] References Cited

U.S. PATENT DOCUMENTS

| | | | |
|---|---|---|---|
| 3,076,679 | 2/1963 | Lorber | 297/481 |
| 3,485,529 | 12/1969 | Marling | 297/481 |
| 3,740,094 | 6/1973 | Hornyak | 297/481 |
| 3,912,328 | 10/1975 | Tanaka | 297/389 |
| 4,025,111 | 5/1977 | Tanaka et al. | 297/390 |
| 4,033,622 | 7/1977 | Boudreau | 297/250 |
| 4,210,365 | 7/1980 | Breitschwendt et al. | 297/481 |
| 4,342,483 | 8/1982 | Takada | 297/488 |
| 4,429,916 | 2/1984 | Hyde et al. | 297/250 |
| 4,789,179 | 12/1988 | Takahashi | 297/481 |
| 4,919,488 | 4/1990 | Deegener et al. | 297/481 X |
| 4,943,112 | 7/1990 | Law | 297/467 X |
| 5,009,469 | 4/1991 | Mouri | 297/481 X |
| 5,061,012 | 10/1991 | Parker et al. | 297/467 |
| 5,082,325 | 1/1992 | Sedlack | 297/250 |
| 5,139,311 | 8/1992 | Imai et al. | 297/481 |
| 5,607,203 | 3/1997 | Sedlack | 297/256.15 |

FOREIGN PATENT DOCUMENTS 3445353  6/1985  Germany ................................ 297/484

Primary Examiner—Peter R. Brown

[57] ABSTRACT

The invention is a car seat with a feature to hold an abdominal shield and/or shoulder straps out of the way while a child enters or exits the seat. A shield, integrally formed with the shoulder straps, has a male element located thereon. A female element, located on the seatback surface of the car seat, forms the other part of the holding feature.

To place a child into the seat, the shield and straps are pulled up and out of the body of the car seat. The shield is placed against the seatback surface of the car seat, such that the male element engages the female element. The shield and straps are thus held out of the way of an entering child. Once the child is suitably positioned in the car seat, the shield is pulled apart from the seatback surface of the car seat, disengaging the male element from the female element. The shield and straps may then be placed over the child's head and shoulders, and buckled in the normal manner.

To remove a child from the seat, The shield and straps are unbuckled and pulled from the child's head and shoulders in the normal manner. The shield is placed against the seatback surface of the car seat, such that the male element engages the female element. The shield and straps are thus held out of the way of an exiting child.

20 Claims, 12 Drawing Sheets

CAR SEAT WITH HOLDER FOR SHIELD AND STRAPS

BACKGROUND OF THE INVENTION

1. Field of Invention

This invention is in the area of child car seats, specifically a car seat with a feature to hold an abdominal shield and/or shoulder straps out of the way while a child enters or exits the seat.

2. Discussion of Prior Art

Child car seats that employ an abdominal shield or pad, integrally formed with the shoulder straps of the car seat, are known in the art. Some of the earliest examples are U.S. Pat. Nos. 3,912,328 to Tanaka; 4,025,111 to Tanaka and Kuszynski; and 4,342,483 to Takada.

A major problem with these prior art car seats is that they have no feature to hold the abdominal shield and shoulder straps out of the way while a child enters or exits the seat. The shield and straps significantly interfere with the process of putting a child into, or removing the child from, the car seat.

Leaving the shield and straps in the body of the car seat, then pulling them out from between a child and the seat after the child is in position, is difficult and unwieldy. The process usually also twists and wrinkles the child's clothing. Pulling the shield and straps up and over the back of the seat, to get them out of the way, also does not work well—the shield and straps are often pulled back down, and back into the way, by the automatic retracting action of the straps.

Shield interference is not an issue in prior art devices wherein the shield operates separately from the shoulder straps, as in U.S. Pat. Nos. 4,429,916 to Hyde, Smith, Carmichael, and Meader; and 5,607,203 to Sedlack. In these devices, the shield is generally bar-shaped, and may be swiveled or rotated out of the way to facilitate a child's entry or exit from the car seat. However, shoulder strap interference with an entering or exiting child remains a problem with these devices.

U.S. Pat. No. 5,061,012 to Parker, Golenz, Knoedler, and Harvey discloses a device wherein the shoulder straps are connected to a bar-shaped shield, such that when the shield is rotated out of the way, the straps are raised with it. However, the straps are permanently affixed to the shield, not releasably fastened; thus, this device does not allow separate operation of the shield and straps.

Similarly, shoulder strap interference is also an issue in prior art devices that do not employ a shield, but instead rely on shoulder straps alone to secure a child, as in U.S. Pat. Nos. 4,033,622 to Boudreau and 5,082,325 to Sedlack.

To summarize, a car seat with a feature to hold the abdominal shield and/or shoulder straps out of the way while a child enters or exits would be a great improvement over prior art car seats.

OBJECTS AND ADVANTAGES:

Accordingly, several objects and advantages of my invention are:

It facilitates entry or exit of a child from a car seat.

It makes it easier for a child to place him or herself in a car seat, or for an older child to place a younger child in a car seat without aid from an adult.

It can be employed in a variety of car seat constructions—car seats with integral shield and shoulder straps, separate shield and straps, or no shield and just straps.

While held out of the way, the shield and straps are held in a position wherefrom they can be easily placed over the child's head and shoulders.

It is safe—there are no projections on the seatback surface of the car seat to potentially injure a child. The male element on the front of the shield is very unlikely to injure a child, due to its position on the side of the shield facing away from the child. To further maximize safety, the male element is of a rounded, blunt nature, and may be constructed of a pliant, yielding material.

Further objects and advantages of my invention will become apparent from a consideration of the drawings and ensuing description.

LIST OF REFERENCE NUMERALS

10. Shield
11a&b. Straps
12. Male element
13. Female element
14. Car seat
15. Strap guide (alternative embodiment)
16. Hook element (alternative embodiment)
17. Loop element (alternative embodiment)

18. Projecting member (alternative embodiment)

19. Shield with releasable fastening means (alternative embodiment)

SUMMARY

My invention is a car seat with a feature that holds an abdominal shield and/or shoulder straps out of the way, thereby facilitating a child's entry or exit from the seat.

DESCRIPTION—MAIN EMBODIMENT

Figure 1:
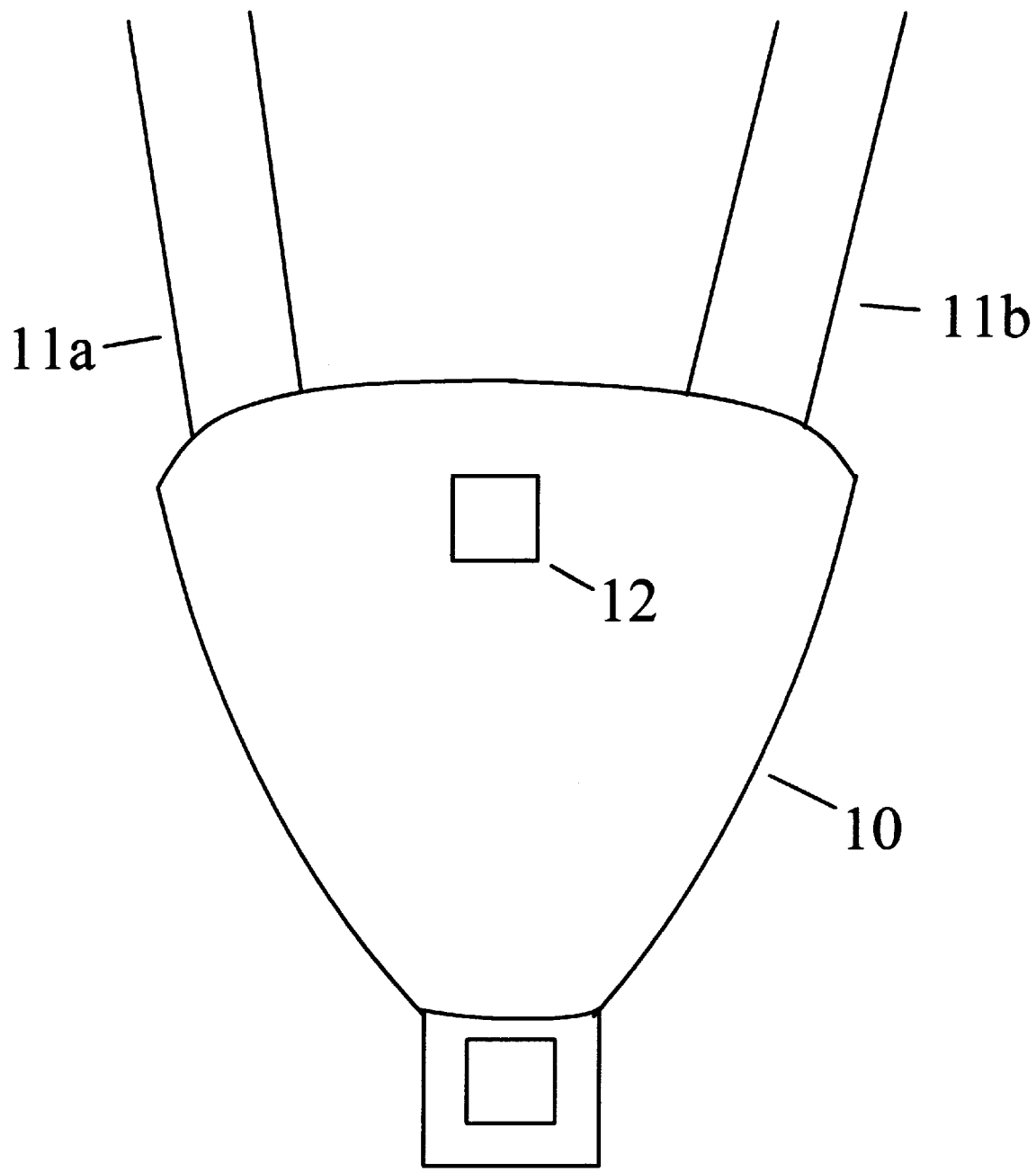
FIG. 1 illustrates the abdominal shield/strap combination and the male element located thereon, for use in a car seat having integrated shield and straps.

As shown in FIG. 1, a shield 10, integrally formed with straps 11a&b, has a male element 12 located thereon. Said male element 12 projects outward from the surface of shield 10, and is square in shape with a blunt, rounded tip.

Figure 2:
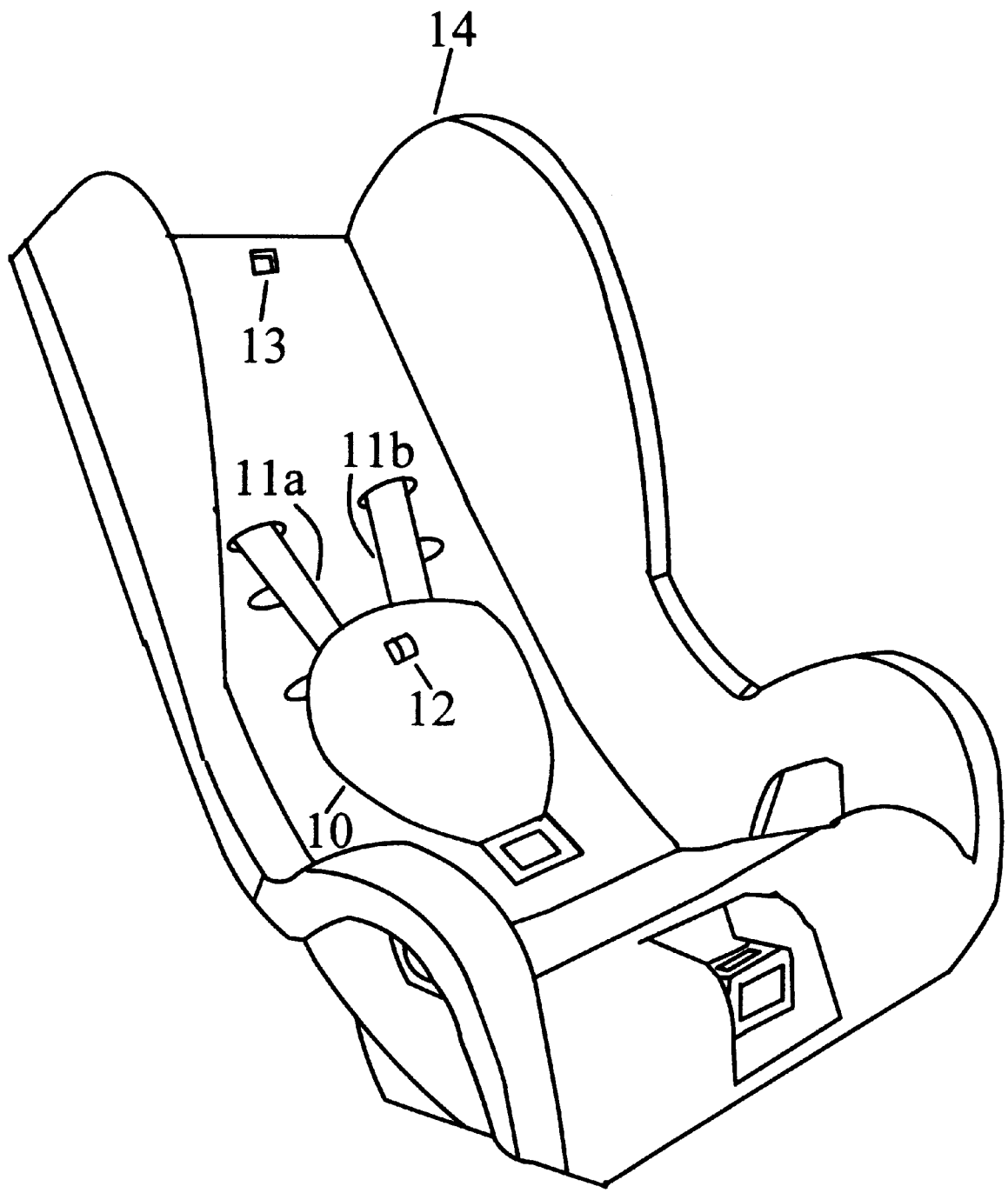
FIG. 2 illustrates the seatback surface of the car seat, and the female element located thereon.
Figure 3:
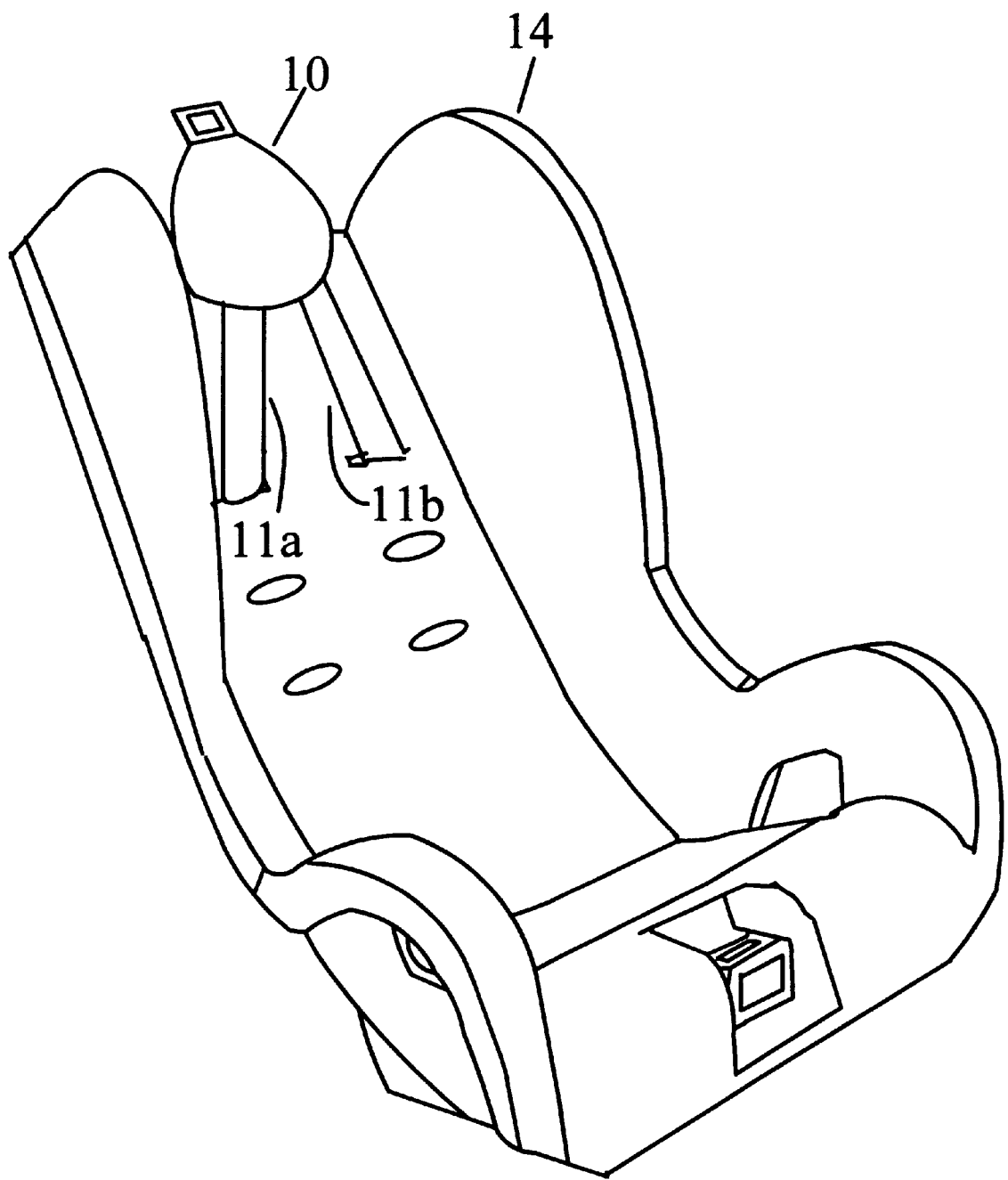
FIG. 3 illustrates the holding feature in an engaged position with the shield/strap combination held out of the way, in a car seat having integrated shield and straps.

As shown in FIG. 2, a female element 13, located on the seatback surface of a car seat 14, forms the other part of the holding feature. Said female element 13 has a square socket-like shape, corresponding to the shape of male element 12. Male element 12 is suitably sized to fit into female element 13, such that engagement of the two elements may be accomplished using a reasonable amount of pushing force, and disengagement may be accomplished using a reasonable amount of pulling force.

OPERATION—MAIN EMBODIMENT

Entry of child into car seat:

Shield 10 and straps 11a&b are pulled up and out of the body of car seat 14. Shield 10 is placed against the seatback surface of car seat 14, such that male element 12 engages female element 13. Shield 10 and straps 11a&b are thereby held out of the way of an entering child. Once the child is suitably positioned in car seat 14, shield 10 is pulled apart from the seatback surface of car seat 14, disengaging male element 12 from female element 13. Shield 10 and straps 11a&b may then be placed over the child's head and shoulders, and buckled in the normal manner.

Exit of child from car seat:

Shield 10 and straps 11a&b are unbuckled and pulled from the child's head and shoulders in the normal manner. Shield 10 is placed against the seatback surface of car seat 14, such that male element 12 engages female element 13. Shield 10 and straps 11a&b are thereby held out of the way of an exiting child.

DESCRIPTION AND OPERATION—ALTERNATIVE EMBODIMENTS

Figure 4:
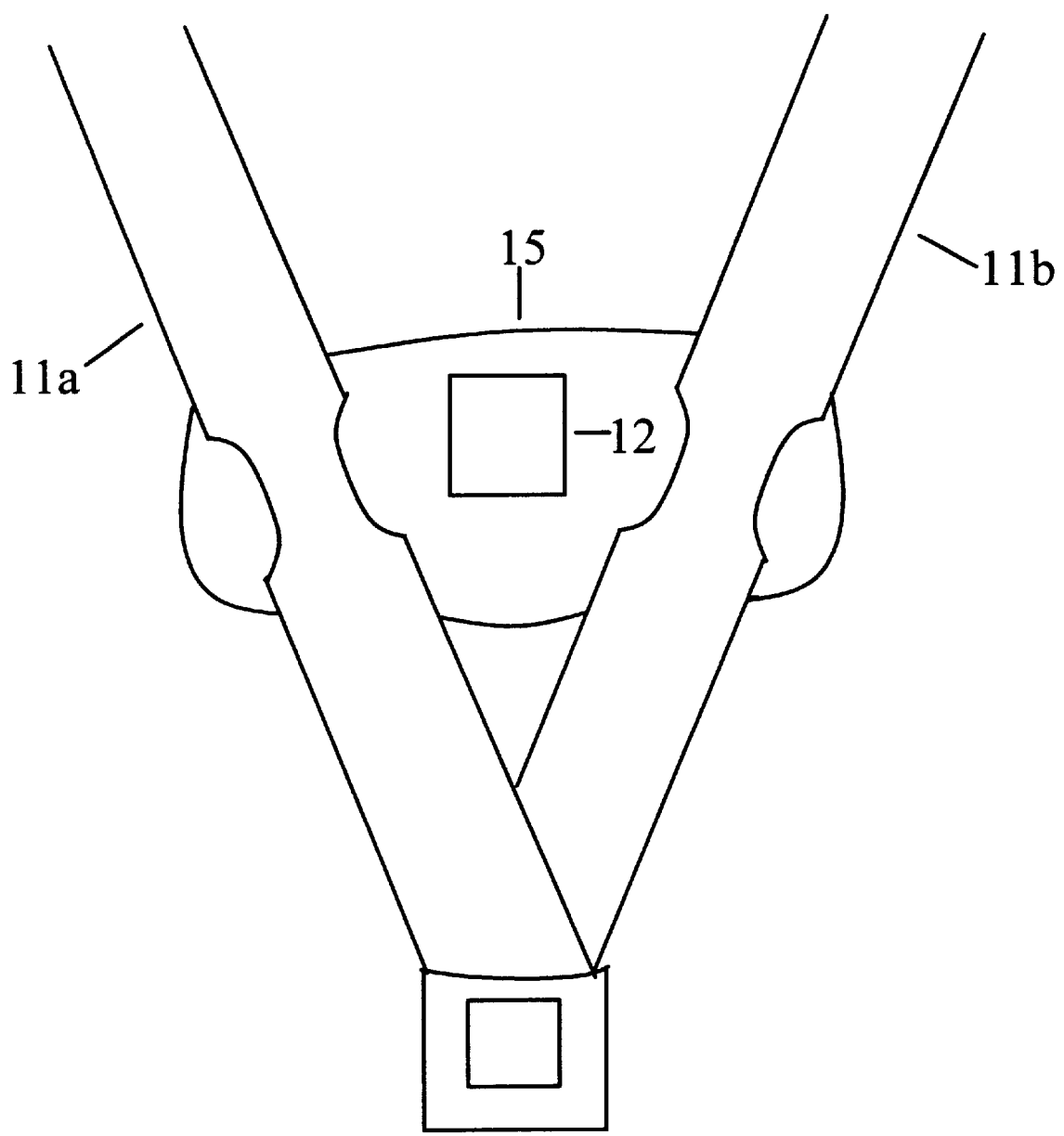
FIG. 4 illustrates an alternative embodiment, wherein the male element is located on a strap guide, for use in a car seat having either separate shield and straps, or no shield and just straps.
Figure 5:
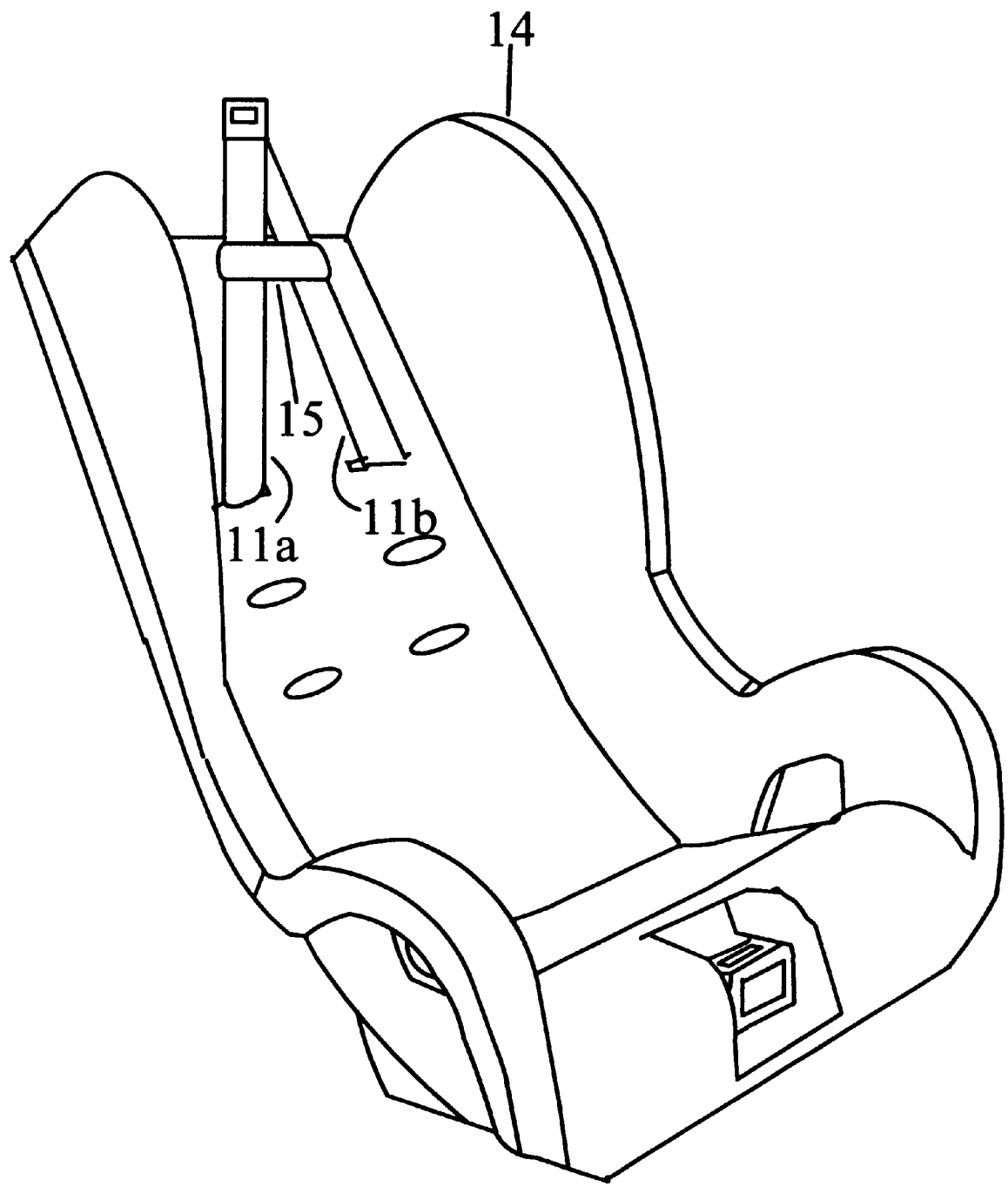
FIG. 5 further illustrates the alternative embodiment of FIG. 4, wherein the holding feature is in an engaged position, with the shoulder straps and strap guide held out of the way.

Version with male element located on a strap guide:

As shown in FIGS. 4 and 5, male element 12 may be located on a strap guide 15, for use in a car seat having either separate shield and straps, or no shield and just straps. Other parts are the same as in the main embodiment.

Operation is similar to the main embodiment, except that strap guide 15 is placed against the seatback surface of car seat 14, such that male element 12 engages female element 13. Strap guide 15 and straps 11a&b are thereby held out of the way of an entering or exiting child. To disengage male element 12 from female element 13, strap guide 15 is pulled apart from the seatback surface of car seat 14. Other operating steps are the same as in the main embodiment.

Figure 6:
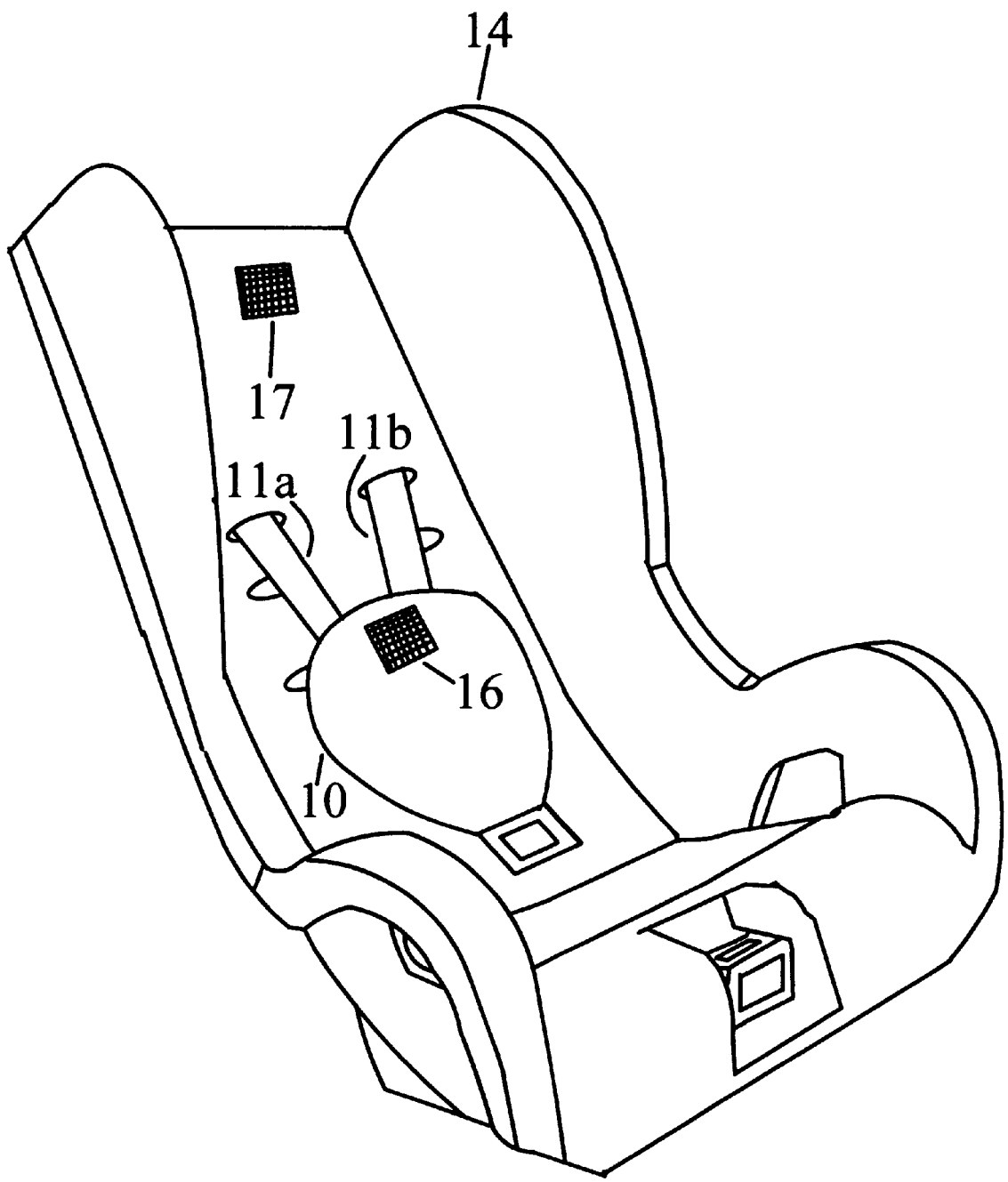
FIG. 6 illustrates an alternative embodiment, wherein the holding feature is comprised of hook-and-loop elements.

Version with holding feature comprised of hook and loop elements:

As shown in FIG. 6, the holding feature may be comprised of a hook element 16 located on shield 10, and a loop element 17 located on the seatback surface of car seat 14. Other parts, as well as other operating steps, are the same as in the main embodiment.

Figure 7:
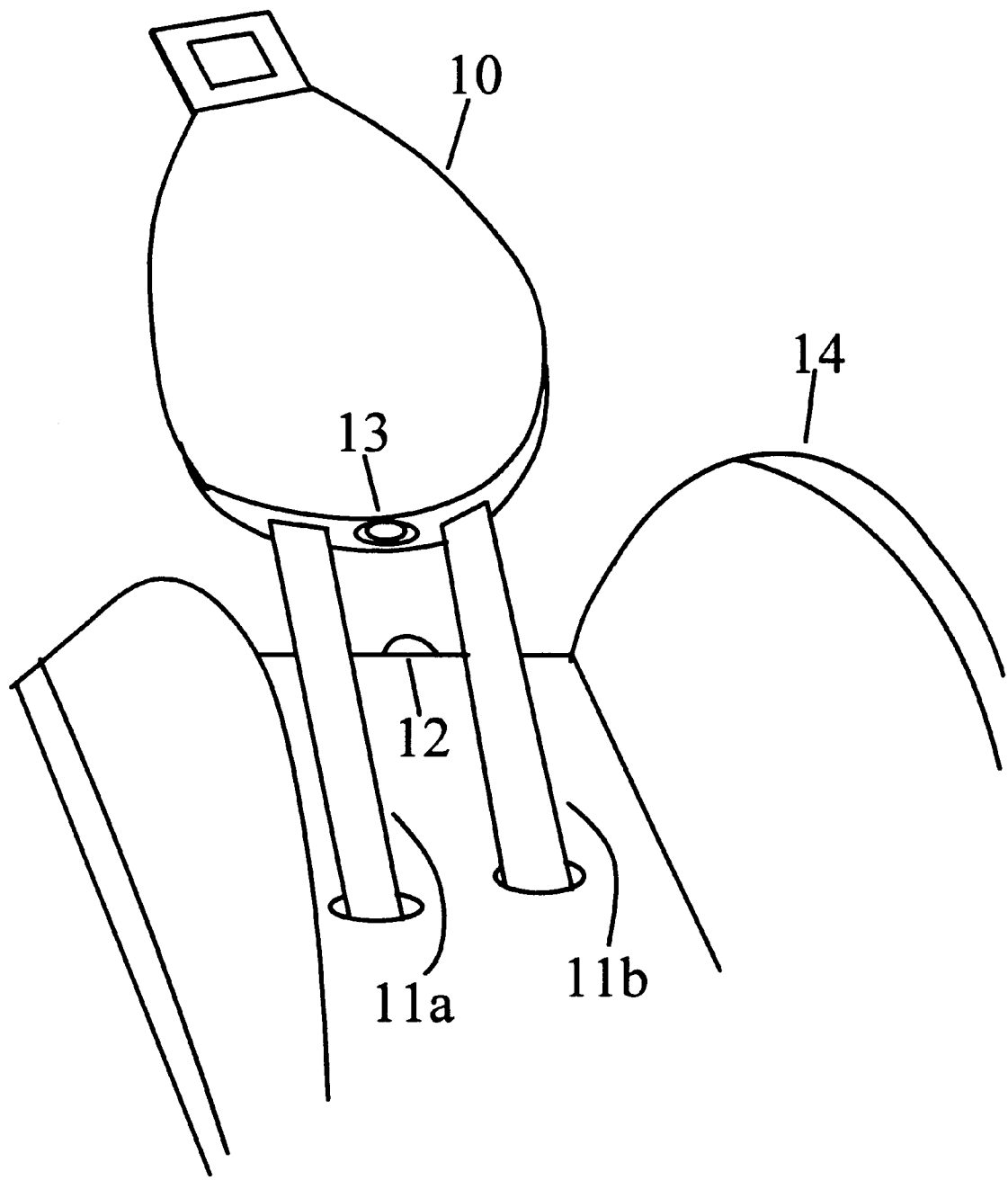
FIG. 7 illustrates an alternative embodiment, wherein a male element is located on the top surface of the car seat, and a female element is incorporated into the shield.

Version with male element located on top surface of seat:

FIG. 7 illustrates an alternative embodiment wherein the position of the male and female elements are reversed—a male element 12 is located on the top surface of car seat 14, and a female element 13 is incorporated into shield 10. Since male element 12 is not located on the body-contacting surface of car seat 14, this version does not present a safety issue. Other parts, as well as other operating steps, are the same as in the main embodiment.

Figure 8:
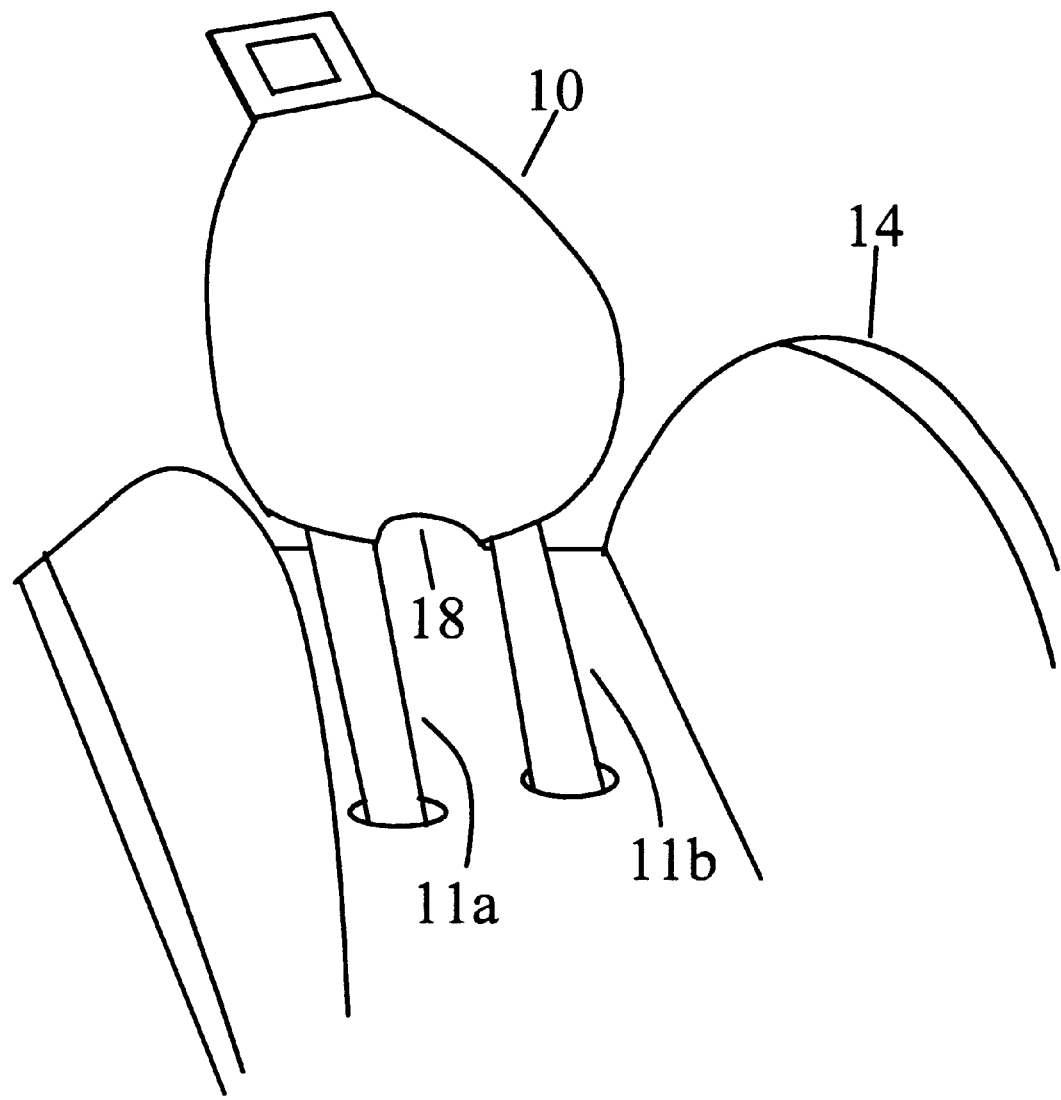
FIG. 8 illustrates an alternative embodiment, wherein a projecting member, behind which the shield is held, is located on the top surface of the car seat.

Version with projecting member located on top surface of seat:

FIG. 8 illustrates an alternative embodiment wherein a projecting member 18 is located on the top surface of car seat 14. Shield 10 is placed behind projecting member 18, thereby holding shield 10 and straps 11a&b out of the way of an entering or exiting child.

Figure 9:
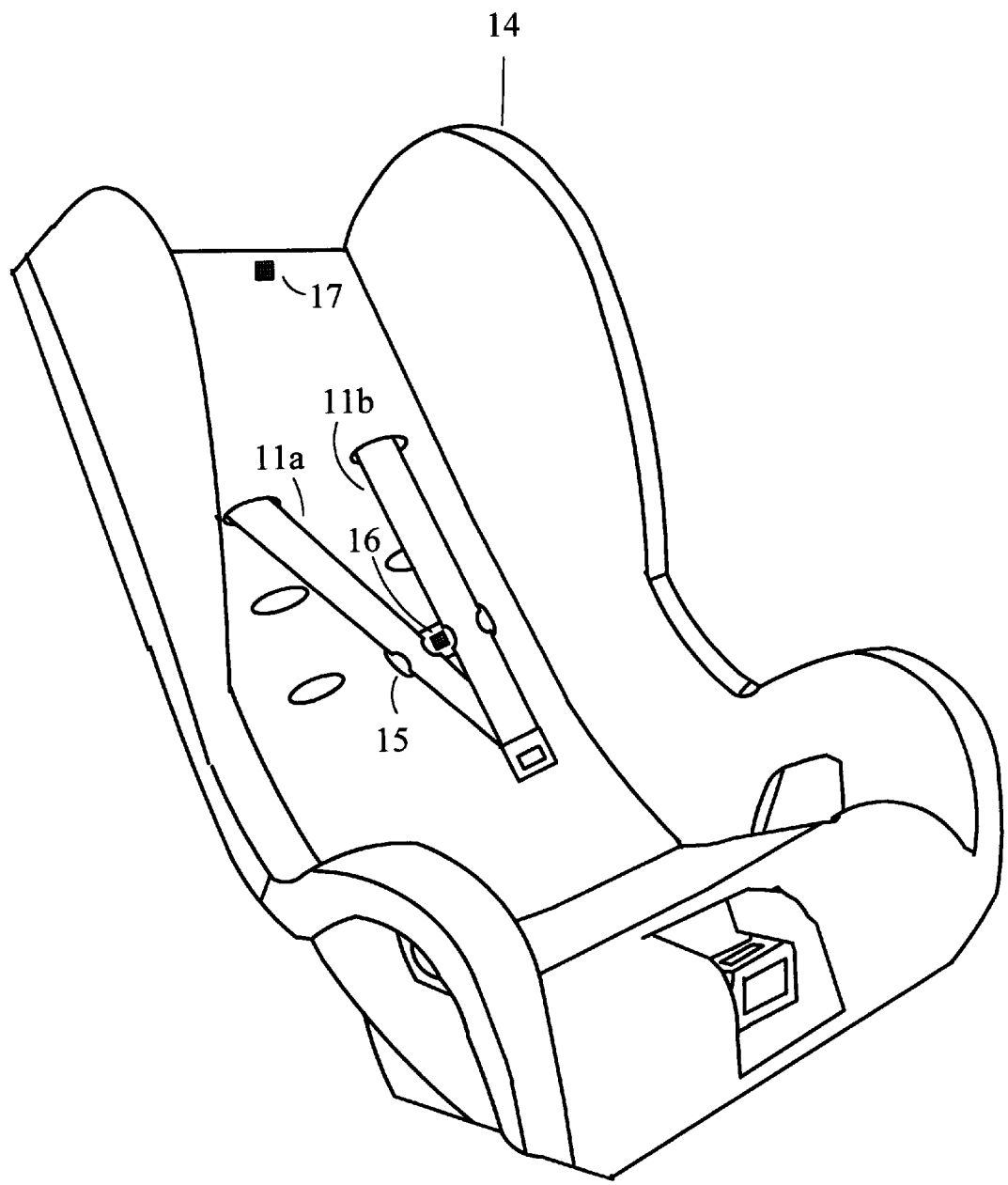
FIG. 9 illustrates an alternative embodiment, wherein a hook element is located on the strap guide, and a loop element is located on the surface of the seat.

Version with hook and loop elements located on strap guide and on surface of seat:

As shown in FIG. 9, the holding feature can be comprised of a hook element 16 located on strap guide 15, and a loop element 17 located on the seatback surface of car seat 14. Other parts, as well as other operating steps, are the same as in the main embodiment.

Figure 10:
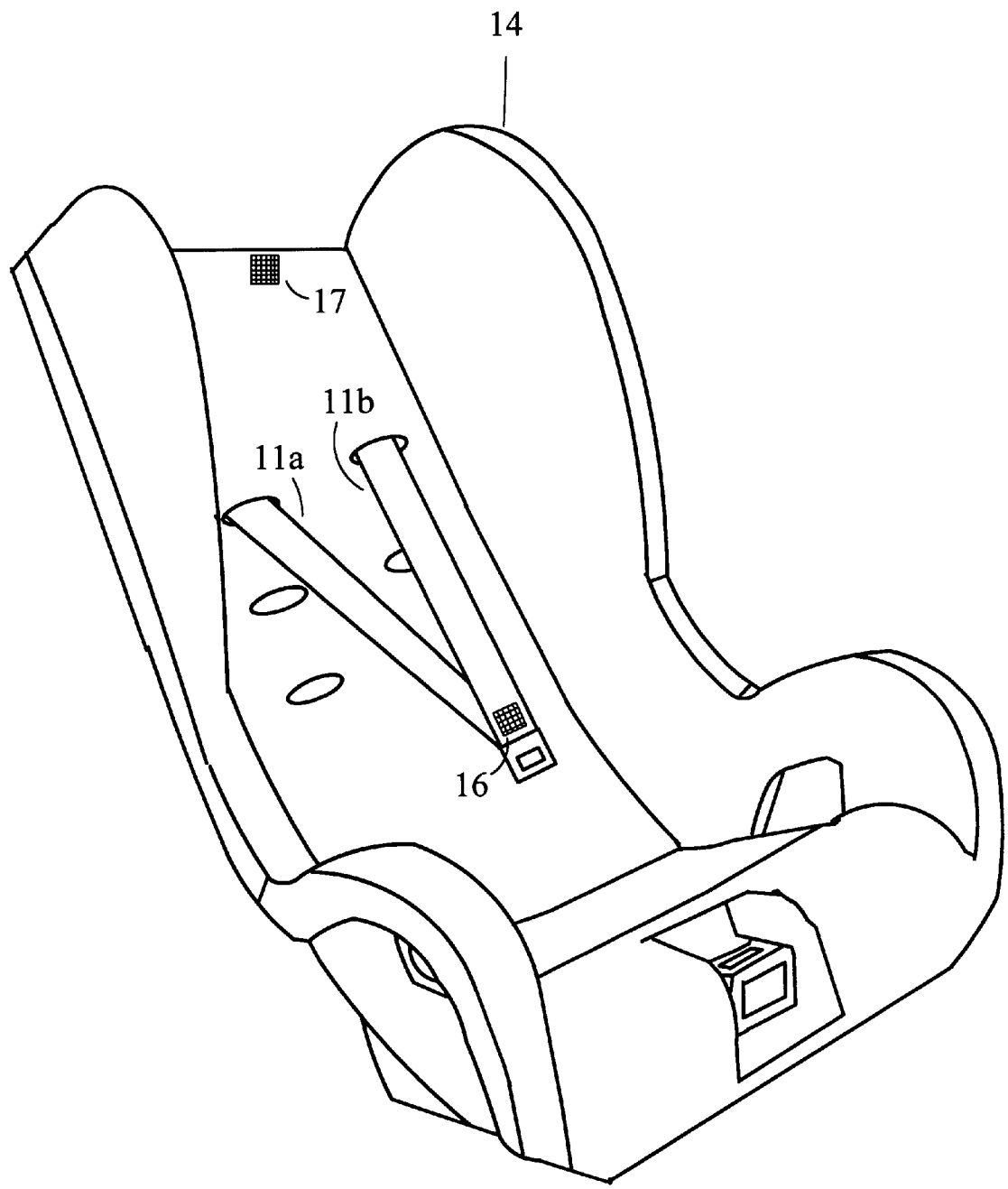
FIG. 10 illustrates an alternative embodiment, wherein straps and a buckle are used as restraint means, without a shield or strap guide, and hook and loop elements are located on the straps and on the surface of the seat, respectively.

Version with hook and loop elements located on straps and on surface of seat:

As shown in FIG. 10, the holding feature can be comprised of a hook element 16 located on strap 11b, and a loop element 17 located on the surface of car seat 14. Other parts, as well as other operating steps, are the same as in the main embodiment.

Figure 11:
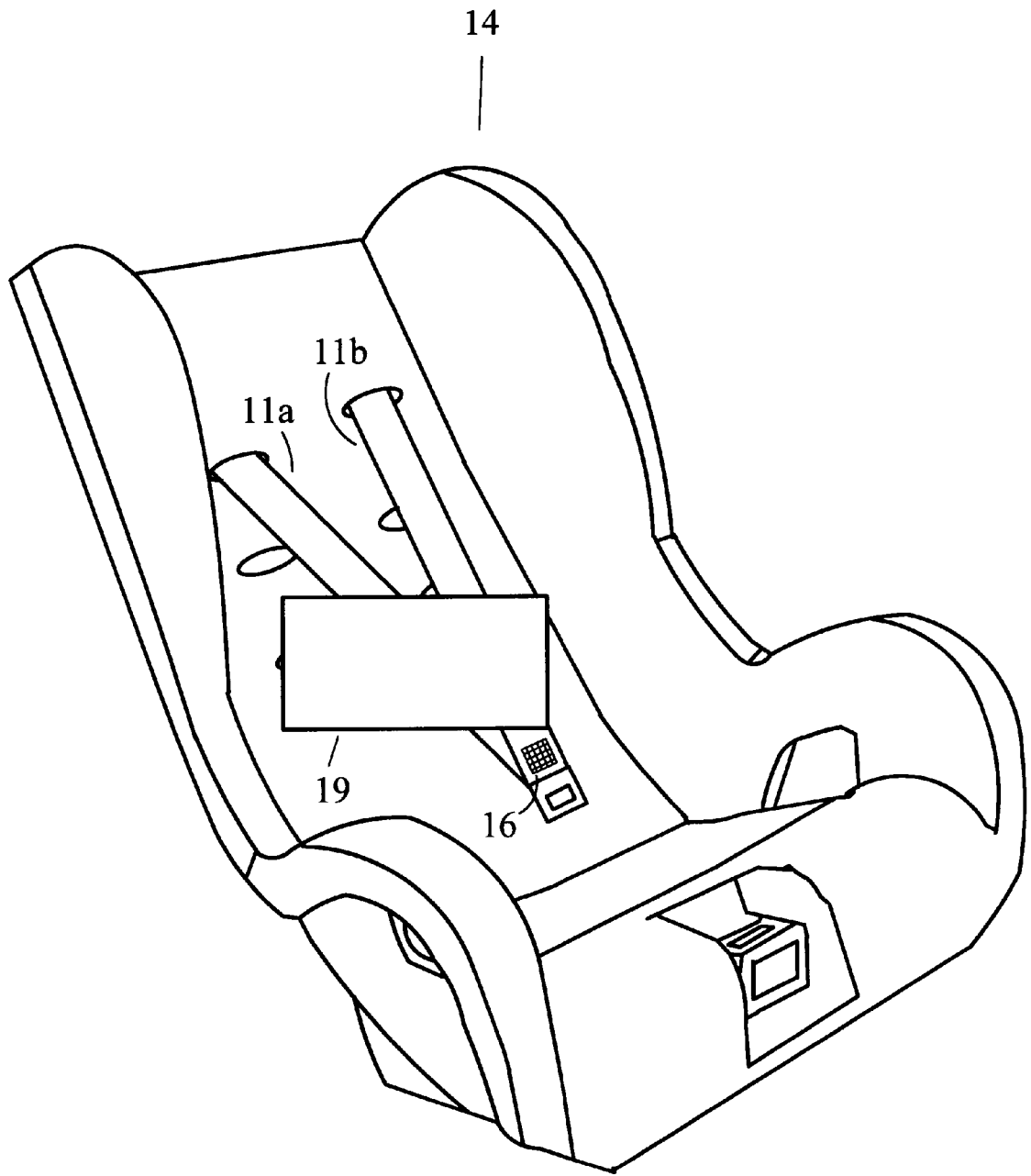
FIG. 11 illustrates an alternative embodiment, wherein a shield with releasable fastening means is shown in the down position, and a hook element, corresponding with the releasable fastening means on the shield, is located on the straps.
Figure 12:
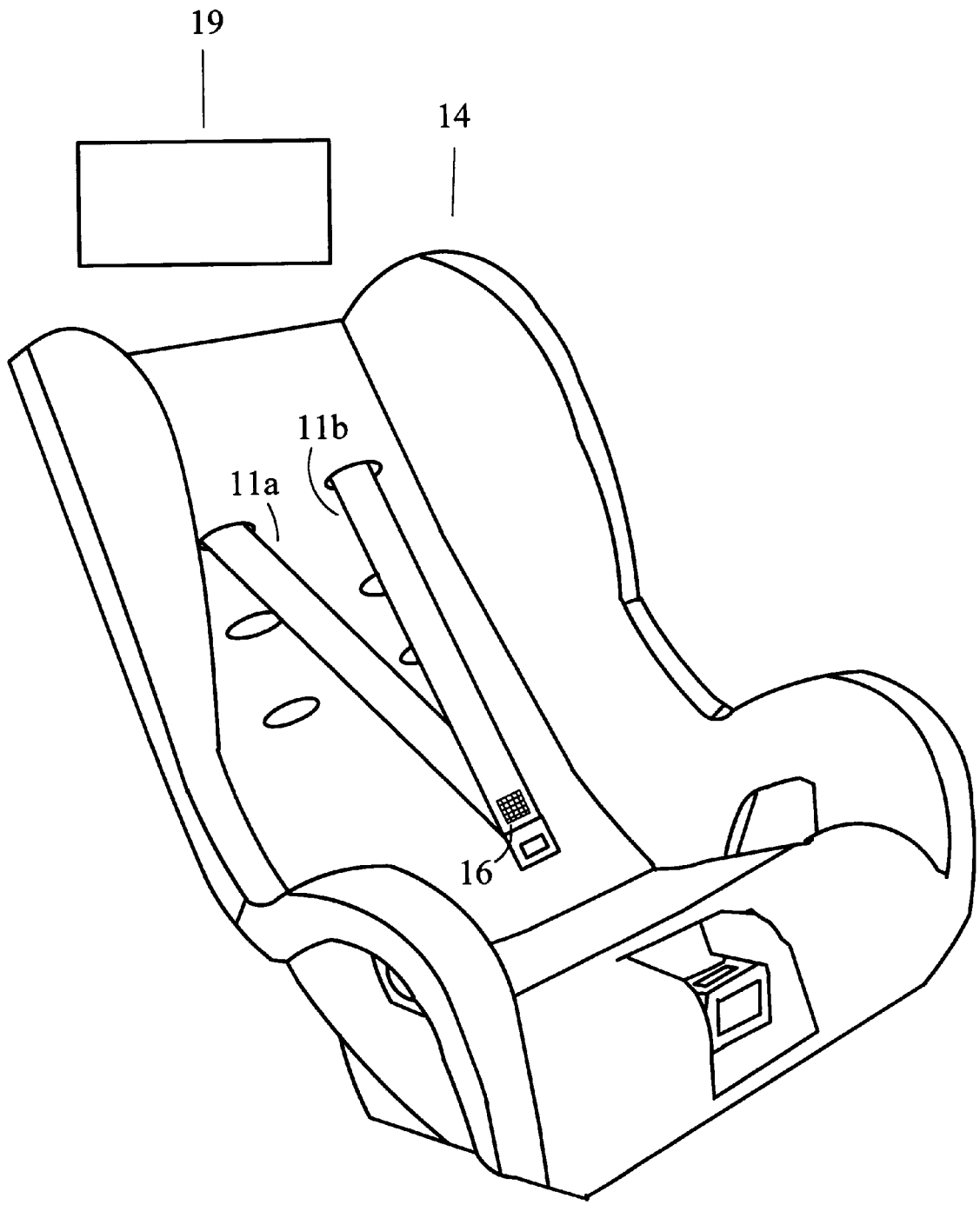
FIG. 12 further illustrates the alternative embodiment of FIG. 11, wherein the shield with releasable fastening means is shown in the up position.

Version with a shield separate from straps, and a hook element and corresponding releasable fastening means located respectively on straps and on shield:

As shown in FIGS. 11 and 12, a shield with releasable fastening means 19 is mounted on car seat 14 separately from straps 11a&b. The holding feature is comprised of a hook element 16 located on strap 11b, and corresponding releasable fastening means located on shield with releasable fastening means 19. When shield with releasable fastening means 19 is in the down position illustrated in FIG. 11, hook element 16 on strap 11b is not engaged with the releasable fastening means on shield with releasable fastening means 19. When shield with releasable fastening means 19 is in the up position illustrated in FIG. 12, such as when removing a child from car seat 14, hook element 16 on strap 11b can be engaged with the releasable fastening means on shield with releasable fastening means 19, thereby holding straps 11a&b out of the way while a child exits car seat 14. Straps 11a&b can be retained in this out-of-the-way position until the child subsequently reenters the seat, and then hook element 16 can be disengaged from the releasable fastening means on shield with releasable fastening means 19, to reinstall straps 11a&b over the child. Other parts, as well as other operating steps, are the same as in the main embodiment.

CONCLUSIONS, RAMIFICATIONS, AND SCOPE

Thus the reader will see that this invention greatly facilitates the task of placing a child into, or removing a child from, a car seat.

While my above description contains many specificities, these shall not be construed as limitations on the scope of the invention, but rather as an exemplification of one preferred embodiment thereof. Many other variations are possible. For example:

In a car seat of integrated shield and strap construction, the shield/strap combination may have multiple male, female, hook, or loop elements, and the body of the car seat may have multiple male, female, hook, or loop elements—provided that the elements correspond with and suitably engage each other.

In a car seat of separate shield and strap construction, or no shield and just strap construction, the strap guide may have multiple male, female, hook, or loop elements, and the body of the car seat may have multiple male, female, hook, or loop elements—provided that the elements correspond with and suitably engage each other. The strap guide or straps may also be releasably fastened to the shield itself, after said shield has been rotated out of the way.

Male, female, hook, and loop elements may be located differently on the body of the car seat, including on the sides or top of the seat. Corresponding male, female, hook, and loop elements may be located differently on the shield or strap guide. However, the elements should suitably engage each other so as to hold the shield and straps out of the way, and should easily disengage from each other.

The shapes and sizes of the male, female, hook, and loop elements may be different.

The male, female, hook, and loop elements may be integrally formed parts of the shield/strap combination, strap guide, or body of the car seat (single-piece construction); or alternatively, may be formed separately (multiple-piece construction).

The male, female, hook, and loop elements may be made from different materials, including various plastics, fibers, rubbers, and metals.

The shield and/or strap holding feature may be used with many different types of seats, not just child car seats. Examples include airplane seats, racing car seats, or any seat having a strap or harness assembly which needs to be held out of the way while someone is entering or exiting the seat.

Accordingly, the scope of the invention should be determined not by the embodiments illustrated, but by the appended claims and their legal equivalents.

I claim:

1. A child's safety seat, comprising:
   a) a seat part and a backrest part, and
   b) restraining means, which includes at least one flexible strap for mounting said restraining means to said seat, to suitably secure said child in said seat, and
   c) releasable fastening means to detachably attach said restraining means to said seat, a first part of said releasable fastening means being located on said restraining means and a corresponding second part of said releasable fastening means being located on said seat, whereby by releasably fastening said restraining means to said seat, said restraining means are held out of the way during entry of said child into said seat or exit of said child from said seat, in order to facilitate such entry or exit.

2. The device of claim 1, wherein said restraining means comprise a shield and strap assembly, said shield and strap assembly comprising a shield permanently and integrally attached to shoulder straps.

3. The device of claim 2, wherein said first and second parts of said releasable fastening means comprise corresponding male and female elements.

4. The device of claim 3, wherein said male element is located on said shield and strap assembly, and said female element is located on the surface of said seat.

5. The device of claim 3, wherein said female element is located on said shield and strap assembly, and said male element is located on the surface of said seat.

6. The device of claim 3, wherein said corresponding male and female elements comprise hook and loop fasteners.

7. The device of claim 6, wherein said hook fastener is located on said shield and strap assembly, and said loop fastener is located on the surface of said seat.

8. The device of claim 1, wherein said first part of said releasable fastening means is formed of one piece with said restraining means, and said second part of said releasable fastening means is formed of one piece with said seat.

9. The device of claim 1, wherein said first part of said releasable fastening means is formed separately from said restraining means, and said second part of said releasable fastening means is formed separately from said seat.

10. The device of claim 1, wherein said restraining means comprise a strap guide and strap assembly.

11. The device of claim 10, wherein said first and second parts of said releasable fastening means comprise corresponding male and female elements.

12. The device of claim 11, wherein said male element is located on said strap guide and strap assembly, and said female element is located on the surface of said seat.

13. The device of claim 11, wherein said corresponding male and female elements comprise hook and loop fasteners.

14. The device of claim 13, wherein said hook fastener is located on said strap guide and strap assembly, and said loop fastener is located on the surface of said seat.

15. The device of claim 1, wherein said restraining means comprise straps.

16. The device of claim 15, wherein said first and second parts of said releasable fastening means comprise corresponding male and female elements.

17. The device of claim 16, wherein said male element is located on said straps, and said female element is located on the surface of said seat.

18. The device of claim 16, wherein said releasable fastening means comprise hook and loop fasteners.

19. The device of claim 18, wherein said hook fastener is located on said straps, and said loop fastener is located on the surface of said seat.

20. The device of claim 1, wherein said restraining means comprise straps, and said first part of said releasable fastening means is located on said straps, and said second part of said releasable fastening means is located on a shield mounted to said seat separately from said straps.

* * * * *